(12) United States Patent
Devos et al.

(10) Patent No.: US 6,296,829 B1
(45) Date of Patent: Oct. 2, 2001

(54) PROCESS FOR THE AQUEOUS PURIFICATION OF HYDROGEN PEROXIDE CONTAINING IMPURITIES

(75) Inventors: Christine Devos, Versailles; Didier Demay, Saint Remy, both of (FR)

(73) Assignee: L'Air Liquide, Societe Anonyme pour l'Etude et l'Exploitation des Procedes Georges Claude (FR)

( * ) Notice: Subject to any disclaimer, the term of this patent is extended or adjusted under 35 U.S.C. 154(b) by 0 days.

(21) Appl. No.: 09/419,878

(22) Filed: Oct. 15, 1999

(30) Foreign Application Priority Data

Oct. 16, 1998 (FR) .................................. 98 13014

(51) Int. Cl.$^7$ .............................. C01B 15/01; B01J 47/14
(52) U.S. Cl. ........................................ 423/584; 210/670
(58) Field of Search .............................. 423/584; 210/670

(56) References Cited

U.S. PATENT DOCUMENTS

| | | | | |
|---|---|---|---|---|
| 5,928,621 | * | 7/1999 | Ledon et al. | 423/584 |
| 5,932,187 | * | 8/1999 | Ledon et al. | 423/584 |
| 5,961,947 | * | 10/1999 | Ledon et al. | 423/584 |
| 6,036,866 | * | 3/2000 | Zimmerman et al. | 210/670 |

FOREIGN PATENT DOCUMENTS

| | | |
|---|---|---|
| 240 999 A3 | 11/1986 | (DE) . |
| 0 846 654 A | 6/1998 | (EP) . |
| 2 677 010 A | 12/1992 | (FR) . |

* cited by examiner

Primary Examiner—Wayne Langel
(74) Attorney, Agent, or Firm—Burns, Doane, Swecker & Mathis, L.L.P.

(57) ABSTRACT

Process for purifying an aqueous hydrogen peroxide solution containing impurities, some of which are in ionic form, in which the said aqueous solution is purified by passing it through at least one first resin of anionic type in order to remove at least some anionic impurities, and then through a second resin of cationic type in order to remove at least some of the cationic impurities, or vice versa, characterized in that at least a first and a second bed of a first resin of anionic type are arranged in parallel, in that the aqueous solution is directed alternately onto the said first or the said second bed, and in that changeover from the first bed to the second bed (or vice versa) is carried out when the said first [lacuna] is at least partially saturated with at least one of the anions constituting the anionic impurities.

34 Claims, 2 Drawing Sheets

PROCESS FOR THE AQUEOUS PURIFICATION OF HYDROGEN PEROXIDE CONTAINING IMPURITIES

This application claims priority under 35 U.S.C. §§119 and/or 365 to 98 13014 filed in France on Oct. 16, 1998; the entire content of which is hereby incorporated by reference.

BACKGROUND OF THE INVENTION

1. Field of the Invention

The present invention relates to a process for purifying an aqueous hydrogen peroxide solution containing impurities, some of which are in ionic form, in which the said aqueous solution is purified by passing it through at least one first resin of anionic type in order to remove at least some of the anionic impurities, and then through a second resin of cationic type in order to remove at least some of the cationic impurities, or vice versa.

2. Description of the Related Art

Hydrogen peroxide is generally manufactured by autoxidation of an anthraquinone derivative or of a mixture of such derivatives. The said anthraquinone derivative(s) is(are) used dissolved in a complex mixture of organic solvents, such as an aromatic hydrocarbon mixed with an ester or an alcohol. This solution constitutes the working solution. This working solution is first hydrogenated in the presence of a catalyst, which brings about the conversion of the quinones into hydroquinones. It is then oxidized by placing it in contact with air or oxygen-enriched air. During this oxidation, the hydroquinones are reoxidized into quinones, with simultaneous formation of hydrogen peroxide. The said hydrogen peroxide is extracted with water and the working solution undergoes a regeneration treatment before being reused.

Since the solubility in the aqueous phase of the organic compounds present is not entirely zero, the aqueous hydrogen peroxide solution thus obtained can contain up to 1000 mg/l of dissolved organic compounds. These compounds are either in the form of ions or in the form of nonionic molecules. In general, acetate and formate ions form the majority of the organic anions.

Various techniques can be used for the purification of such a solution, such as liquid-liquid extraction, distillation, crystallization, passage through adsorbent resins and/or ion-exchange resins, reverse osmosis, filtration, ultrafiltration, etc.

Generally, such an aqueous solution, obtained by autoxidation of at least one anthraquinone derivative, undergoes a first distillation intended in particular to concentrate it. This first distillation is performed, in principle, at the same hydrogen peroxide production site and is carried out in metal plants, generally aluminium plants. On contact with these metal plants, the aqueous hydrogen peroxide solution becomes charged with metal ions from the wear of the surfaces of the said plants with which it is placed in contact. This contamination with metal ions nevertheless remains minimal with respect to the contamination with organic anions which is inherent in the autoxidation process described previously.

The hydrogen peroxide solution thus produced after having been distilled once is referred to as being of IPG ("Industrial Pure Grade") quality. It can be used directly in the food and pharmaceuticals industries. It can also be purified to reach a higher quality intended in particular for the electronics industry, for cleaning the surface of silicon wafers on which integrated circuits are subsequently produced.

A person skilled in the art differentiates the grades VLSI, ULSI and SLSI whose concentration for each cation is less than 100, 10 and 1 ppb, respectively. An ultra-pure grade whose concentration for each cation is less than 0.1 ppb has recently appeared.

Purification starting with an IPG-grade solution is generally carried out in several steps and includes a second distillation followed by passage(s) through ion-exchange resins, or even in addition at least one passage through adsorbent resin. The said distillation is carried out in glass columns, which minimizes the risks of metal pollution. This second distillation has the effect of lowering the concentrations of cations and anions in the hydrogen peroxide solutions, in particular the concentration of acetate ions. This is due to the vapour pressure of acetic acid, which is about 8 times as high as that of hydrogen peroxide at 20° C.

SUMMARY OF THE INVENTION

The process according to the invention is a process for purifying an aqueous hydrogen peroxide solution, which makes it possible to achieve, starting with the IPG grade, a quality which is suitable for the electronics industry, the said process making it possible to dispense with the second distillation.

The process according to the invention is characterized in that at least a first and a second bed of a first resin of anionic type are arranged in parallel, in that the aqueous solution is directed alternately onto the said first or the said second bed, and in that changeover from the first bed to the second bed (or vice versa) is carried out when the resin contained in the first bed is at least partially exchanged with at least one of the anions constituting the anionic impurities.

DETAILED DESCRIPTION OF THE PREFERRED EMBODIMENTS

Figure 1:
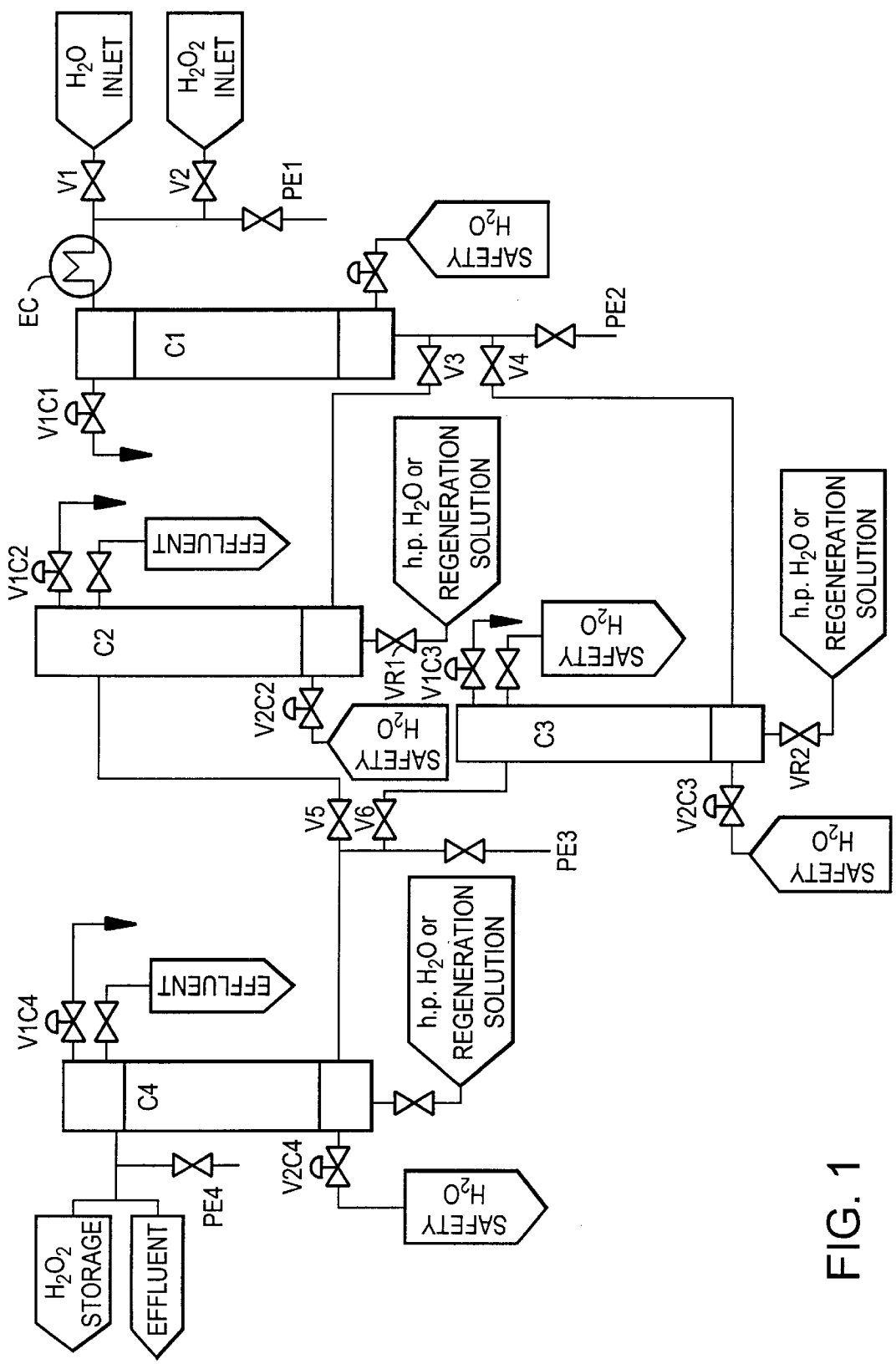
FIG. 1 of the Drawing schematically depicts the process of the present invention.

According to one preferred embodiment of the invention, the process is characterized in that a plurality of beds, arranged in parallel, of a first resin of anionic type is used, each bed being used successively until at least partially exchanged with at least one of the anions constituting the anionic impurities.

The expression "at least partially exchanged with at least one of the anions constituting the anionic impurities" means exchange to at least 50% of the total capacity of the resin. Preferably, this situation will be at least 70% and more preferably at least 80%, of this total capacity, this total capacity being well known to those skilled in the art.

At least one of the beds will preferably comprise a plurality of resins, stacked in successive beds or mixed together, which are capable of adsorbing the anionic impurities with a different selectivity.

According to one embodiment of the invention, the process is characterized in that the organic anionic impurities are larger in number than the in-organic anionic impurities. Preferably, the organic anionic impurities will essentially be in the form of acetates and formates.

According to one preferred embodiment of the invention, the inorganic anionic impurities will essentially be in the form of nitrate.

The concentration of acetate ions relative to a hydrogen peroxide solution at a concentration of 30% by volume in water will, according to the invention, be at least about $300 \times 10^{-3}$ millieq/l.

The concentration of acetate ions relative to a hydrogen peroxide solution at a concentration of 30% by volume in water will more preferably be not more than about $2000 \times 10^{-3}$ millieq/l.

As regards the concentration of nitrate ions relative to a hydrogen peroxide solution at a concentration of 30% by volume in water, it will preferably be at least about $30 \times 10^{-3}$ millieq/l and more preferably not more than about $100 \times 10^{-3}$ millieq/l.

The flow rate of hydrogen peroxide per volume of resin will be between about $4 \ h^{-1}$ and $40 \ h^{-1}$, preferably between $10 \ h^{-1}$ and $30 \ h^{-1}$, and even more preferably between $15 \ h^{-1}$ and $25 \ h^{-1}$.

According to one embodiment variant of the invention, at least one of the anionic resins used is capable of exchanging acetate and/or nitrate ions. Preferably, at least one of these anionic resins used will be a copolymer of styrene and divinylbenzene.

According to another embodiment variant of the invention, at least one of the resins used will be of type 1, i.e. comprising a functional group which is a quaternary ammonium group, obtained by amination of a chloromethylated copolymer of styrene and divinylbenzene. Preferably, the counterion used with the copolymer resin cited above will be a bicarbonate ion.

According to one embodiment variant of the invention, the second resin of cationic type will be arranged in the form of a bed comprising at least one cationic resin, whereas, when several cationic resins are used stacked in successive beds or mixed together, at least one of the cationic resins will be, according to one variant of the invention, a copolymer of styrene and divinylbenzene. Preferably, this copolymer will be strongly acidic.

More preferably, the cationic resin in the form of a copolymer of styrene and divinylbenzene will comprise a functional group which is a sulphonic group.

In general, the second cationic resin will be dispersed in the form of a plurality of beds arranged in series and/or in parallel. Preferably, at least one of the cationic resins will be capable of exchanging at least one of the ions $Na^+$, $Al^{3+}$ and/or $Fe^{3+}$.

In general, the aqueous hydrogen peroxide solution will comprise between $0.5 \times 10^{-3}$ millieq/l and $20 \times 10^{-3}$ millieq/l of sodium, while it will also or alternatively comprise between $2 \times 10^{-3}$ and $20 \times 10^{-3}$ millieq/l of aluminium and it will also or alternatively comprise between $0.05 \times 10^{-3}$ and $0.5 \times 10^{-3}$ millieq/l of iron.

The hydrogen peroxide solution used will generally be first placed in contact with an adsorbent of neutral organic matter before being placed in contact with at least one anionic and/or cationic resin or vice versa, it will be preferred to place the anionic resin before the cationic resin should the hydrogen peroxide solution extract cations, such as sodium, contained in the skeleton of the anionic resin. These cations will then be retained on the cationic resin and not added to the peroxide. Conversely, the cationic resin will be placed before the anionic resin if anions (such as sulphates) are liable to be extracted from the cationic resin. Preferably, at least one of the beds of at least one of the resins used will be provided with safety means capable of triggering a rinsing of at least one of the beds when an anomaly is detected in the progress of at least one process step. This rinsing will preferably be carried out with water and even more preferably with very pure water, so as not to introduce impurities and to restart the system faster after the anomaly has been detected.

The resistivity of the water used will thus preferably be greater than 18 MΩ. cm at 25° C.

The safety means will preferably comprise means for measuring the flow rate of hydrogen peroxide solution through the bed of resin, so as to trigger the rinsing of the said resins when the flow rate value measured is less than a predetermined value of about 4 times the volume of resin in the column per hour.

The safety means will also preferably comprise at least one probe for detecting the temperature of the hydrogen peroxide solution which is in contact with the bed of resin. It is also possible to provide safety means which are sensitive to abnormal functioning of one of the services used during the process, such as the electricity, water or compressed-air supply and/or to actuation of an emergency switch. Although this is not essential for the functioning of the process of the unit according to the invention, this preferred embodiment adds enormously to the operational safety of such a plant, which is particularly beneficial to the user.

In order to ensure autonomy and great safety of the system, a reserve of ultra-pure water will generally be provided in this system, so as to be able to carry out the rinsing described above, this rinsing operation carried out by a so-called "deluge" system.

The process and device of the invention are, in general, particularly advantageous with reference to the problem of safety, the risk of decomposition of hydrogen peroxide in the columns loaded with anionic resins. A large volume of anionic resin, according to the prior art, is replaced, according to the invention, with several small volumes. This is explained in detail later in the present text.

In general, the process of the invention has been designed for the purification of an aqueous hydrogen peroxide solution containing organic and metallic impurities, present in ionic or nonionic form, the anions, which are predominant, being in organic form. The said process also comprises passage of the said solution through ion-exchange resins, through at least one anionic resin and through at least one cationic resin. The passage of the said solution through anionic resin(s) comprises its passage through a column of an array of at least two columns, the columns mounted in parallel, containing an anionic resin, the treated solution being diverted, advantageously without interruption of the process, from upstream of one of the said columns of the array, when the anionic resin contained in the said column is at least partially saturated, to another of the said columns of the said array.

In the context of the implementation of the process of the invention, an array of anionic columns mounted in parallel is thus used. It is thus possible to divert the treated flow from any one of the columns of the array to another of the said columns of the array. This diversion is advantageously carried out without interrupting the process. In any case, with or without interruption of the process, this diversion makes the implementation of the process more flexible and less dangerous. It makes it possible, on the one hand, to dispense with the waiting phase, which is inevitable according to the prior art, during the rinsing and regeneration of the anionic resin used in a column of a standard purification circuit, the said anionic resin being saturated faster than its cationic counterpart used in another column, the said columns being mounted in series. It makes it possible, on the other hand, to work in safety with small volumes of anionic resin. The said small volumes (filling the n columns of the array) are advantageously used alternately.

The purification circuit which is suitable for carrying out the process of the invention thus comprises the array of anionic columns mounted in parallel and, upstream and/or downstream of the said array, at least one cationic column, mounted in series with the said array. According to one embodiment variant, the said purification circuit comprises at least one other anionic column mounted in series.

It is thus possible, according to the invention, to obtain solutions of so-called "electronic" grade starting with solutions of IPG grade.

Preferably, the passage of the treated solutions through the anionic and cationic resins is advantageously carried out as an ascending flow.

A person skilled in the art knows that anionic resins are liable to decompose the hydrogen peroxide when it is left in contact with them for too long. This decomposition of hydrogen peroxide is accompanied by an increase in temperature which itself entails the risk of damaging the resins, and an evolution of oxygen which is liable to cause columns containing the said resins to explode. It is understood that, under such conditions, during the implementation of the process of the invention, when the treated flow is deviated from one column of the array to another column of the said array, the anionic resin contained in the said column, thus placed outside the circuit (due to its degree of saturation), is preferably rinsed immediately. Water will preferably be used to carry out such a rinsing, the water preferably being injected into the bottom of the column to be rinsed.

The taking of a column out of the circuit is advantageously exploited to regenerate the resin it contains. The said column will then be operational, once again ready to receive a flow of solution to be treated.

The regeneration of the resins can be carried out in the column. It can also be carried out on the said resin, removed from the column, in a manner which is known per se.

It has been indicated that, in the context of the process of the invention, the treated solution is passed through at least one anionic resin and through at least one cationic resin. Advantageously, its passage through anionic resin(s) is carried out upstream of its passage through cationic resin(s). The said passage through anionic resin(s) characteristically comprises its passage through a column of an array of at least two columns, mounted in parallel. It can also comprise its passage through at least one column mounted in series with the said array of columns mounted in parallel and/or its passage through a column of another array of at least two columns, mounted in parallel. The same anionic resin or different anionic resins can be used in these anionic columns, mounted in series and/or in parallel.

In the same way, passage through cationic resin(s) can be carried out according to several variants. In a first variant, a single cationic column or several cationic columns mounted in series or in parallel are in the purification circuit.

Preferably, in order to avoid any risk of decomposition of the hydrogen peroxide on contact with the anionic and cationic resins, the process of the invention is carried out at a temperature of between 0 and 25° C., preferably between 0 and 15° C. and even more preferably at a temperature substantially equal to about 10° C. (+/−2° C.).

With reference to the problem of degradation of the resins used, it may be pointed out here that the treated aqueous solutions are rarely aqueous hydrogen peroxide solutions containing more than 60% by weight of hydrogen peroxide. The treated solutions according to the invention are generally aqueous solutions which contain from 10 to 60% by weight of hydrogen peroxide. The process of the invention is most particularly suitable for the purification of aqueous solutions at a concentration of 30% by weight, which are intended in particular for use in the electronics industry.

The resins used in the context of the present invention are, for example, those described in U.S. Pat. No. 3,305,314.

Strongly acidic cationic resins will preferably be used, which are obtained by sulphonation of a copolymer of styrene and divinylbenzene. Preferably also, anionic resins of type 1 will be used, which are obtained by amination of a chloromethylated copolymer of styrene and divinylbenzene.

The purification process of the invention can also include, upstream and/or downstream of the treatment on resins, any additional treatment of any nature, such as passage through an adsorbent resin and/or a crystallization step to remove the organic carbon present in nonionic form in the aqueous hydrogen peroxide solutions.

Assuming that the process of the invention is carried out for the production of very pure aqueous hydrogen peroxide solutions, in particular intended for the electronics industry, the original treatment described (on ion-exchange resins) may be followed by an additional purification step, advantageously carried out at the site of use of the said solutions, thereby making it possible to avoid them becoming contaminated during their transportation.

The present invention also relates to a device for purifying an aqueous hydrogen peroxide solution containing organic and/or metal impurities present in ionic or nonionic form, the anions, which are predominant, being in organic form.

The said device charateristically comprises:
at least one column containing a cationic resin,
an array of at least two columns containing an anionic resin, mounted in parallel, and
a system for deviating the treated solution from upstream of one of the columns of the said array to another of the columns of the said array.

The device is advantageously designed such that the columns are fed with an ascending flow.

Each of the columns of the said device generally comprises:
a pipe, at the bottom of the column, which is useful for passing the rinsing liquid (such as water) to rinse the said column and for passing the regenerating solution to regenerate the resin contained in the said column;
a pipe, at the top of the column, which is useful for discharging, for disposal, the rinsing liquid and the spent regenerating solution.

Moreover, the said device advantageously comprises a column safety system. Such a system comprises an array of pipes and suitable means (valves, water tanks, optional means for cooling the said water, etc.) to ensure the passage of water, optionally cooled, independently in each of the columns, at a flow rate which is preferably greater than the operating flow rate of the unit. The said safety system is arranged to be triggered, in principle, both manually and automatically, in the event, for example, of a temperature increase in a column or in the event of abnormal stoppage of the flow rate of aqueous hydrogen peroxide solution, when the unit is in operation.

The purification unit according to the invention will preferably comprise a safety system for rinsing the resin(s)

contained in each column with water, so as to remove the hydrogen peroxide therefrom in a very short space of time. Each column will thus preferably be fitted with independent water inlet and outlet pipes, which are different from the pipes used in the normal running of the unit, so as to be able to achieve very rapid rinsing of the resins. The diameter of the pipes in this system will be very preferably adapted such that each resin is rinsed with at least five times its volume of water in less than five minutes, (for the minimum safety conditions, see the limits cited above).

The inlet and outlet of the water will take place preferably via pneumatic valves which are normally open in the safety position. The unit will switch to the safety position when a risk of immobilizing the hydrogen peroxide on one of the resins has been detected or in the event of a temperature increase in the liquid, in particular in the columns or at the column outlet. The safety position can also be actuated by loss of the power supply, loss of the compressed air supply, loss of the monitoring and/or control of the apparatus, or by the action of the operator by pressing an emergency stop button for a reason chosen by the operator. The water used to rinse the resins will preferably be ultra-pure water with a resistivity of greater than 18 MΩ.cm at 25° C., such that the unit is ready to restart after rinsing the resins. To ensure the supply of ultra-pure water, it will be preferable to add a container dedicated to this rinsing purpose, the volume of which will be sufficient to rinse the columns in operation. When it is not possible to add a stock of ultra-pure water, the rinsing of the resins may be carried out with mains water, and in particular when the ultra-pure water supply is out of service.

The invention is now described, in a non-limiting manner, with the aid of the attached FIGS. 1 and 2 and the examples described below.

EXAMPLE

The plant described in FIG. 1 represents one embodiment example of the present invention. The unit is constructed with materials suitable for the production of ultra-pure chemical products used in the electronics industry. The body of the columns is made of PVDF and has an inside diameter of about 12 cm, the pipes, valves and components of the pumps in contact with the product being made of PFA.

The column C1 contains an adsorbent material such as that sold under the trade name "Ambersorb XAD4" by the company Rohm & Haas. This adsorbent is designed to retain the nonionic organic matter contained in the hydrogen peroxide solution to be purified.

Columns C2 and C3 are loaded with an anion-exchange resin, such as the resin sold under the trade name "Amberlite IRA958" by the company Rohm & Haas. This resin is treated in a manner which is known per se to change the $Cl^-$ ionic form into $HCO_3^-$, before being placed in the columns. Its total exchange capacity is equal to 0.8±0.2 eq $Cl^-$/liter.

The cation-exchange resin, such as the one sold by the company Dow Chemicals under the trade name "Dowex C75 NGH", is loaded into column C4. Its total exchange capacity is equal to 1.7±0.2 eq $H^+$/liter.

The plant comprises a safety device designed to rinse the resins very rapidly with ultra-pure water, at a flow rate of 8 l/min. This device can be actuated by the operator or triggered automatically during the purification when the flow rate of hydrogen peroxide is stopped, or when a temperature increase is detected in one of the columns.

This very rapid rinsing of the 3 columns in operation is carried out via the pneumatic valves V1C1 and V2C1 for C1, V1C2 and V2C2 for C2, V1C3 and V2C3 for C3, and V1C4 and V2C4 for C4.

An aqueous 30.1% monodistilled hydrogen peroxide solution of IPG (Industrial Pure Grade) quality is sent, via a pump at a flow rate of 2.5 liters/min, to a heat exchanger H.C. in which it is cooled to 10° C.

The hydrogen peroxide thus cooled passes through column C1 from the top downwards and then through column C2 or C3 from the bottom upwards. The valves V4 and V6 are closed and valves V3 and V5 are open. After passing through column C2 or C3 (according to the invention) containing the anionic resin, the hydrogen peroxide solution is pumped from the bottom upwards in column C4 and then sent to the finished product storage. The content in each of the columns C1 to C4 by volume is equal to 19 $h^{-1}$.

Samples are taken regularly after columns C2 (or C3) and C4 via the sampling valves PE3 and PE4, respectively. The concentrations of acetate and sodium ions are measured in the samples thus collected.

The concentrations in the hydrogen peroxide before purification are:
Na=0.3 mg/l or $13\times10^{-6}$ equivalents/liter
$CH_3CO_2$=25 ppm or $400\times10^{-6}$ equivalents/liter.

Figure 2:
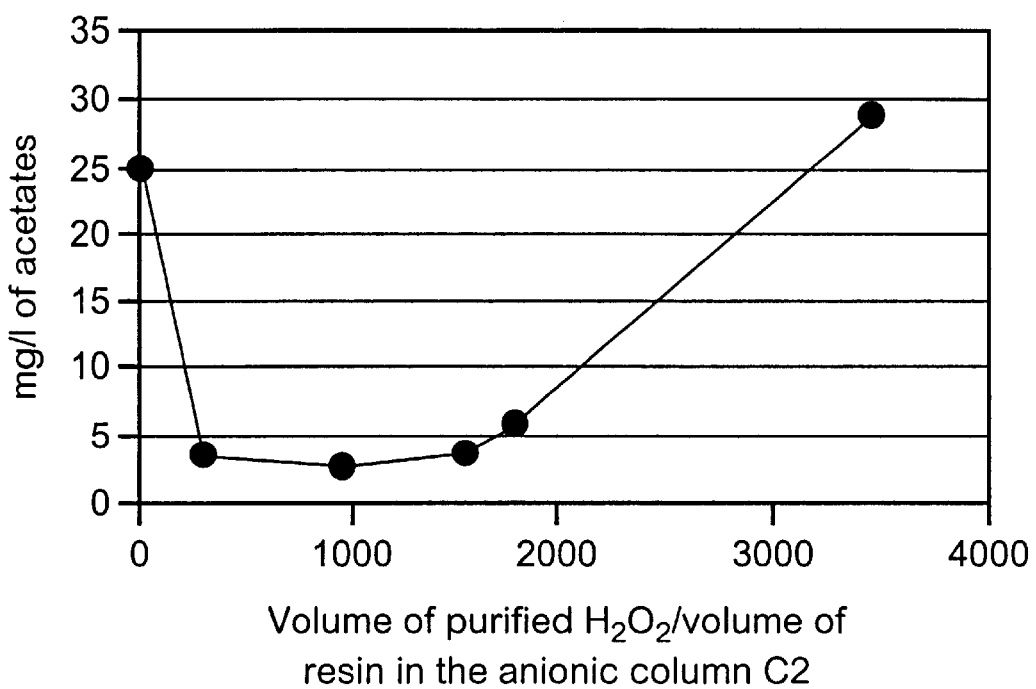
FIG. 2 of the Drawing graphically depicts acetate concentration as a function of the amount of hydrogen peroxide purified.

FIG. 2 shows the acetate concentration as a function of the amount of hydrogen peroxide purified. After about an amount, in liters, of hydrogen peroxide equivalent to 1500 times the volume of resin contained in column C2, it is considered that the anion exchanger is saturated.

The theoretical calculation shows that the acetates retained take 70% of the total capacity of the anionic resin, the rest being taken by the other anions, such as nitrates and phosphates.

The concentration of sodium ions in the purified hydrogen peroxide after analysis by ICP/MS, is found to be less than 0.1 $\mu$g/l. The theoretical calculation shows that only 9% of the total capacity of the cationic resin contained in column C4 is occupied by sodium ions after purification of an amount equal to 1500 times the volume of the bed of anionic resin.

After a volume of hydrogen peroxide equivalent to 1500 times the volume of anionic resin contained in C2 (resin considered as "saturated" and thus requiring regeneration), the valves V3 and V5 are closed and the valves V4 and V6 are simultaneously opened. The purification of the hydrogen peroxide can thus continue without interruption, according to the process of the invention.

While the columns C1, C3 and C4 are used, the anionic resin contained in column C2 is regenerated with aqueous 1N sodium bicarbonate solution via dedicated pipes (simply represented schematically in the figure under the valve VR1 "regeneration solution"). The resin is then rinsed with water of high purity, with a resistivity at least equal to 18 MΩ.cm, until all traces of the regeneration solution are completely removed.

After saturation of the anionic resin contained in C3, the flow of hydrogen peroxide will be tipped up on the column C2 and the resin contained in C3 will be regenerated.

Each anionic column will thus preferably be regenerated at least 3 times before rinsing the unit with ultra-pure water, to allow renewal of the adsorbent in C1 and of the cationic resin in C4.

What is claimed is:

1. Process for purifying an aqueous hydrogen peroxide solution containing impurities, some of which are in ionic form, comprising: passing said solution (i) through at least one first, anionic resin to remove at least some anionic impurities, and then through a second, cationic resin in order to remove at least some cationic impurities, or (ii) through at least one first, cationic resin to remove at least some cationic impurities, and then through a second, anionic resin to remove at least some cationic impurities, wherein at least a first and a second bed of the anionic resin are arranged in parallel, wherein the aqueous solution is directed alternately to said first or said second bed, and changeover from the first bed to the second bed or from the second bed to the first bed is carried out when the resin contained in the first bed or the second bed, respectively, is at least partially exchanged with at least one of the anions constituting the anionic impurities, and wherein at least one of the beds of at least one of the resins is provided with safety means capable of triggering a rinsing of at least one of the beds when an anomaly is detected in the progress of at least one process step, wherein the anomaly is based on one or more of hydrogen peroxide solution flow rate, hydrogen peroxide solution temperature, abnormal functioning of a utility service, and actuation of an emergency switch.

2. Process according to claim 1, wherein each of the beds of anionic resin arranged in parallel is used successively until at least partially exchanged with at least one of the anions constituting the anionic impurities.

3. Process according to claim 1, wherein at least one of the beds comprises a plurality of resins, stacked in successive beds or mixed together, which are capable of exchanging the anionic impurities with a different selectivity.

4. Process according to claim 1, wherein the concentration of organic anionic impurities in the aqueous solution is larger than the concentration of inorganic anionic impurities in the aqueous solution.

5. Process according to claim 1, wherein essentially all of the organic anionic impurities in the aqueous solution are in the form of acetates and formates.

6. Process according to claim 1, wherein essentially all of the inorganic anionic impurities in the aqueous solution are in the form of nitrates.

7. Process according to claim 1, wherein the aqueous hydrogen peroxide solution to be purified has a concentration of 30% by volume, and wherein the concentration of acetate ions in the aqueous solution to be purified is at least about $300 \times 10^{-3}$ millieq/l.

8. Process according to claim 1, wherein the aqueous hydrogen peroxide solution to be purified has a concentration of 30% by volume, and wherein the concentration of acetate ions in the aqueous solution to be purified is not more than about $2000 \times 10^{-3}$ millieq/l.

9. Process according to claim 1, wherein the aqueous hydrogen peroxide solution to be purified has a concentration of 30% by volume, and wherein the concentration of nitrate ions in the aqueous solution to be purified is at least about $30 \times 10^{-3}$ millieq/l.

10. Process according to claim 1, wherein the aqueous hydrogen peroxide solution to be purified has a concentration of 30% by volume, and wherein the concentration of nitrate ions in the aqueous solution to be purified is not more than about $100 \times 10^{-3}$ millieq/l.

11. Process according to claim 1, wherein the flow rate of hydrogen peroxide per volume of resin is between 4 and 40 $h^{-1}$.

12. Process according to claim 11, wherein the flow rate of hydrogen peroxide per volume of resin is between 10 and 30 $h^{-1}$.

13. Process according to claim 12, wherein the flow rate of hydrogen peroxide per volume of resin is between 15 and 25 $h^{-1}$.

14. Process according to claim 1, wherein at least one of the anionic resins used is capable of absorbing acetate and/or nitrate ions.

15. Process according to claim 1, wherein at least one of the anionic resins used is a copolymer of styrene and divinylbenzene.

16. Process according to claim 15, wherein at least one of the resins used comprises a functional group which is a quaternary ammonium group, obtained by amination of a chloromethylated copolymer of styrene and divinylbenzene.

17. Process according to claim 16, wherein the ionic form of at least one of the resins used is $HCO_3^-$.

18. Process according to claim 1, wherein the cationic resin is arranged in the form of one or more beds, each bed comprising at least one cationic resin.

19. Process according to claim 18, wherein at least one of the cationic resins is a copolymer of styrene and divinylbenzene.

20. Process according to claim 19, wherein the copolymer is strongly acidic.

21. Process according to claim 20, wherein the ionic form of at least one of the cationic resins used is $H^+$.

22. Process according to claim 1, wherein the cationic resin is dispersed in the form of a plurality of beds arranged in series and/or in parallel.

23. Process according to claim 18, wherein at least one of the cationic resins is capable of adsorbing at least one of the ions $Na^+$, $Al^{3+}$ and $Fe^{3+}$.

24. Process according to claim 1, wherein the aqueous hydrogen peroxide solution to be purified comprises between $0.5 \times 10^{-3}$ millieq/l and $20 \times 10^{-3}$ millieq/l of sodium.

25. Process according to claim 1, wherein the aqueous hydrogen peroxide solution to be purified comprises between $2 \times 10^{-3}$ and $20 \times 10^{-3}$ millieq/l of aluminum.

26. Process according to claim 1, wherein the aqueous hydrogen peroxide solution to be purified comprises between $0.05 \times 10^{-3}$ and $0.5 \times 10^{-3}$ millieq/l of iron.

27. Process according to claim 1, wherein the aqueous hydrogen peroxide solution to be purified is of industrial pure grade quality.

28. Process according to claim 1, wherein the aqueous hydrogen peroxide solution to be purified is placed in contact with an adsorbent of neutral organic matter before being placed in contact with the first of the at least one anionic and cationic resin.

29. Process according to claim 1, wherein the rinsing is carried out with water.

30. Process according to claim 29, wherein the resistivity of the water is greater than or equal to 18 MΩ·cm at 25° C.

31. Process according to claim 30, wherein the safety means comprise means for measuring the flow rate of hydrogen peroxide solution through the at least one bed of resin, so as to trigger the rinsing of said at least one resin bed when the flow rate value measured is less than a predetermined value of four times the volume of resin in the bed per hour.

32. Process according to claim 1, wherein the safety means comprise at least one probe for detecting the temperature of the hydrogen peroxide solution which is in contact with the at least one bed of resin.

33. Process according to claim 1, wherein the safety means are also sensitive to abnormal functioning of a utility service used during the process and/or to actuation of an emergency switch.

34. Process according to claim 33, wherein the utility service is electricity, water, or compressed-air supply.

* * * * *